US008839400B2

(12) United States Patent
Anderson et al.

(10) Patent No.: US 8,839,400 B2
(45) Date of Patent: Sep. 16, 2014

(54) MANAGING AND CONTROLLING ADMINISTRATOR ACCESS TO MANAGED COMPUTER SYSTEMS

(71) Applicant: International Business Machines Corporation, Armonk, NY (US)

(72) Inventors: Eric Anderson, Friendswood, TX (US); Christopher J. Dawson, Arlington, VA (US); Leslie A. Nelson, Benson, NC (US); Brett W. Singletary, Clayton, NC (US)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 13/628,537

(22) Filed: Sep. 27, 2012

(65) Prior Publication Data

US 2014/0090022 A1    Mar. 27, 2014

(51) Int. Cl.
*G06F 7/04* (2006.01)
*G06F 15/173* (2006.01)
(52) U.S. Cl.
USPC .................................. 726/10; 726/4; 709/225
(58) Field of Classification Search
USPC ........ 726/1–7, 10, 26–30; 713/150, 168, 180, 713/182; 709/217–219, 223, 225, 227–229
See application file for complete search history.

(56) References Cited

U.S. PATENT DOCUMENTS

| 8,087,075 | B2 | 12/2011 | Peterson et al. | |
|---|---|---|---|---|
| 8,185,550 | B1 * | 5/2012 | Eichler et al. | 707/783 |
| 2003/0061512 | A1 * | 3/2003 | Flurry et al. | 713/201 |
| 2003/0065731 | A1 * | 4/2003 | Mohammed et al. | 709/208 |
| 2003/0182242 | A1 | 9/2003 | Scott et al. | |
| 2004/0179654 | A1 * | 9/2004 | Boetje et al. | 379/9.03 |
| 2004/0187038 | A1 * | 9/2004 | Yachida | 713/202 |
| 2004/0210771 | A1 * | 10/2004 | Wood et al. | 713/201 |
| 2004/0243824 | A1 | 12/2004 | Jones | |
| 2004/0268151 | A1 * | 12/2004 | Matsuda | 713/201 |
| 2005/0086494 | A1 * | 4/2005 | Carley | 713/182 |
| 2005/0125677 | A1 * | 6/2005 | Michaelides | 713/185 |
| 2006/0037063 | A1 * | 2/2006 | Clemmons et al. | 726/4 |
| 2007/0100782 | A1 * | 5/2007 | Reed et al. | 707/1 |
| 2007/0101440 | A1 * | 5/2007 | Bhatia et al. | 726/28 |
| 2007/0143826 | A1 * | 6/2007 | Sastry et al. | 726/2 |

(Continued)

OTHER PUBLICATIONS

U.S. Appl. No. 61/592,186.*

(Continued)

*Primary Examiner* — Darren B Schwartz
(74) *Attorney, Agent, or Firm* — Edward P. Li; John R. Pivnichny

(57) ABSTRACT

A method and computer program product for managing and controlling access of an administrator to a managed computer system. At least one computer program on an access system of the managed computer system receives from the administrator a request for access to the managed computer system and requests a managing computer system to search open tickets for service management. In response to that the open tickets are not found, the at least one computer program redirects the administrator to log onto the managing computer system to obtain a new open ticket for the access. In response to that the open tickets are found, the at least one computer program requests the administrator to choose at least one ticket from the open tickets and grants the administrator the access to the managed computer system in response to determining that the at least one ticket is valid.

17 Claims, 3 Drawing Sheets

(56) References Cited

U.S. PATENT DOCUMENTS

| | | |
|---|---|---|
| 2007/0283012 A1* | 12/2007 | Chu et al. .................... 709/225 |
| 2008/0168531 A1* | 7/2008 | Gavin ............................ 726/1 |
| 2008/0195614 A1* | 8/2008 | Lutz et al. ...................... 707/7 |
| 2009/0210285 A1* | 8/2009 | Nielsen et al. ................. 705/9 |
| 2010/0010848 A1* | 1/2010 | Marchman et al. ............ 705/7 |
| 2010/0100953 A1 | 4/2010 | Mowers |
| 2011/0126003 A1* | 5/2011 | Engert ......................... 713/156 |
| 2011/0145907 A1 | 6/2011 | Chua |
| 2011/0289547 A1 | 11/2011 | Aggarwal et al. |
| 2012/0023568 A1* | 1/2012 | Cha et al. ....................... 726/10 |
| 2013/0198038 A1* | 8/2013 | Mowatt et al. ............. 705/26.41 |
| 2013/0198358 A1* | 8/2013 | Taylor ........................... 709/223 |
| 2013/0198827 A1 | 8/2013 | Bhaskaran |

OTHER PUBLICATIONS

Quest Software Inc., "Developer and Administrator Access to Production" [online]. Copyright 2011 Quest Software Inc., [retrieved on May 10, 2012]. Retrieved from the internet:<URL: http://www.webcitation.org/67U3FkE1z>.

* cited by examiner

MANAGING AND CONTROLLING ADMINISTRATOR ACCESS TO MANAGED COMPUTER SYSTEMS

FIELD OF THE INVENTION

The present invention relates generally to computer service management technologies and tools, and more particularly to managing and controlling administrator access to managed computer systems.

BACKGROUND

In computer service management, a service management ticketing system is used for managing and maintaining tickets such as incident, problem, and change tickets. The service management ticketing system ensures that administrator tasks of service management on a managed computer system are performed in a specific order. However, there is no way to prevent an administrator from logging onto the managed computer system and carrying out a task without a valid service management ticket. In computer service management, there is a demand for managing and controlling administrator access to managed computer systems. Currently known solutions are related to access restrictions.

SUMMARY

Embodiments of the present invention provide a method and computer program product for managing and controlling access of an administrator to a managed computer system. At least one computer program on an access system of the managed computer system receives from the administrator a request for access to the managed computer system. The at least one computer program requests a managing computer system to search open tickets which are managed by the managing computer system for the managed computer system. In response to that the open tickets are found, the at least one computer program requests the administrator to choose at least one ticket from the open tickets. In response to that the administrator chooses the at least one ticket from the open tickets, the at least one computer program checks status of the at least one ticket to determine whether the at least one ticket is valid. And, in response to determining that the at least one ticket is valid, the at least one computer program grants the administrator the access to the managed computer system.

Embodiments of the present invention provide another method for managing and controlling access of an administrator to a managed computer system. At least one computer program on an access system of the managed computer system receives from the administrator a request for access to the managed computer system. The at least one computer program requests a managing computer system to search open tickets which are managed by the managing computer system for the managed computer system. In response to that the open tickets are not found, the at least one computer program redirects the administrator to log onto the managing computer system. The at least one computer program receives, from the managing computer system, a ticket generated by the managing computer system. And, the at least one computer program grants the administrator the access to the managed computer system.

DETAILED DESCRIPTION

Figure 1:
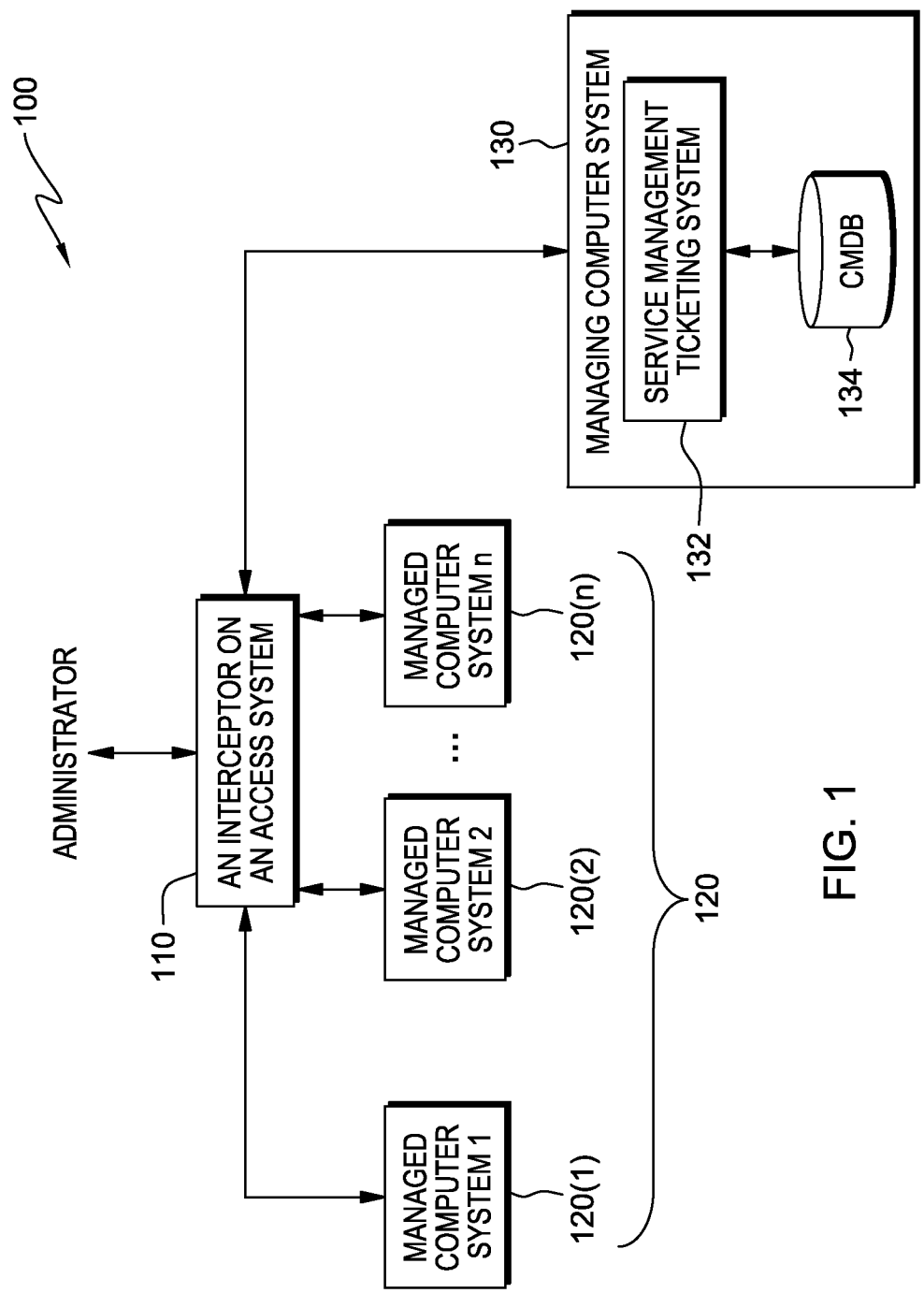
FIG. 1 is a diagram illustrating a service management system for managing and controlling administrator access to managed computer systems, in accordance with an exemplary embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a diagram illustrating service management system 100 for managing and controlling administrator access to managed computer systems 120, in accordance with an exemplary embodiment of the present invention. Service management system 100 includes interceptor 110 on an access system, one or more managed computer systems 120, and service management ticketing system 132 and configuration management database (CMDB) 134 both hosted by managing computer system 130. In the exemplary embodiment, service management ticketing system 132 and CMDB 134 are hosted by one computer device. In other embodiments, service management ticketing system 132 and CMDB 134 may reside on two separate computer devices, respectively.

Interceptor 110 is software including at least one computer program which resides on the access system. Interceptor 110 on the access system intercepts access of administrators to one or more managed computer systems 120. The access system is an entry point to one or more managed computer systems 120. The access system may be a firewall to one or more managed computer systems 120, a proxy server, or virtual private network (VPN) server. In the exemplary embodiment, the access system is hosted by a computer device at the entry point of one or more managed computer systems 120. In service management system 100 of the present invention, administrators log onto to one or more managed computer systems 120 from outside of the entry point and through interceptor 110 on the access system.

Interceptor 110 on the access system communicates with service management ticketing system 132 on managing computer system 130 via an application programming interface (API) such as XML (extensible markup language), SOAP (simple object access protocol), web services, or others.

When a request for logging onto a specific one of managed computer systems 120, e.g. managed computer system 1 120 (1), is made by an administrator, interceptor 110 on the access system gives the administrator a warning message that the administrator is accessing a managed computer system under access restriction. This message may be presented using a banner, a pop-up, or other communication.

In response to receiving from the administrator the request for logging onto the specific one of managed computer systems 120, e.g. managed computer system 1 120(1), interceptor 110 on the access system requests service management ticketing system 132 on managing computer system 130 to search open service management tickets for the specific one of managed computer system 120. Service management tickets are managed by service management ticketing system 132 and stored on CMDB 134. The service management tickets include, for example, incident, problem, and change tickets. Each of the service management tickets is associated with a task of service management which is to be performed by the administrator.

Referring to FIG. 1, on managing computer system 130, service management ticketing system 132 searches the open service management tickets by querying CMDB 134. For example, a simple way of searching the open service management tickets is to search the text in descriptions of the open service management tickets. The text in the descriptions includes necessary information for identifying the specific one of managed computer system 120, for example, the hostname and/or the IP address. As another example, a complex way of searching the open service management tickets is to search configuration items (CIs) of the specific one of managed computer system 120. The CIs are tied to incident, problem, and change tickets.

Interceptor 110 presents all the open service management tickets to the administrator and requests the administrator to choose at least one ticket from the open service management tickets. In order to perform a task of service management, the administrator must choose the at least one ticket from the open service management tickets. If the administrator chooses the at least one ticket, interceptor 110 checks whether the at least one ticket is valid by checking status of the at least one ticket. For example, in the case of a change ticket, interceptor 110 checks whether the change ticket has status of "in progress" or "scheduled". In response to determining that the status is "in progress", interceptor 110 determines that the change ticket is valid; in response to determining that the status is "scheduled", interceptor 110 determines that the change ticket is not valid.

In service management system 100 of the present invention, interceptor 110 grants the administrator access to the specific one of managed computer system 120 in response to determining that the at least one ticket is valid. Otherwise, interceptor 110 denies the administrator the access in response to determining that the at least one ticket is not valid.

In service management system 100 of the present invention, interceptor 110 redirects the administrator to log onto service management ticketing system 132 on managing computer system 130, under a situation where the open service management tickets are not found on CMDB 134 or the administrator does not choose the at least one ticket from the open service management tickets. If the administrator is redirected to log onto service management ticketing system 132, a new ticket is generated for the administrator by service management ticketing system 132. Once interceptor 110 receives the newly generated ticket from service management ticketing system 132, interceptor 110 grants the administrator the access to the specific one of managed computer system 120.

In service management system 100 of the present invention, interceptor 110 records information of the administrator access on a log. For example, the information recorded on the log includes information of who, when and why the administrator logs onto the specific one of managed computer system 120. Interceptor 110 transfers the information to service management ticketing system 132, and service management ticketing system 132 stores the information on CMDB 134.

In other embodiments of the present invention, interceptor 110 on the access system may allow the administrator read-only access to the specific one of managed computer system 120, under a situation where the at least one ticket chosen by the administrator is not valid. Interceptor 110 logs the read-only access such that the administrator's activities beyond limitations of the read-only access are flagged.

Figure 2:
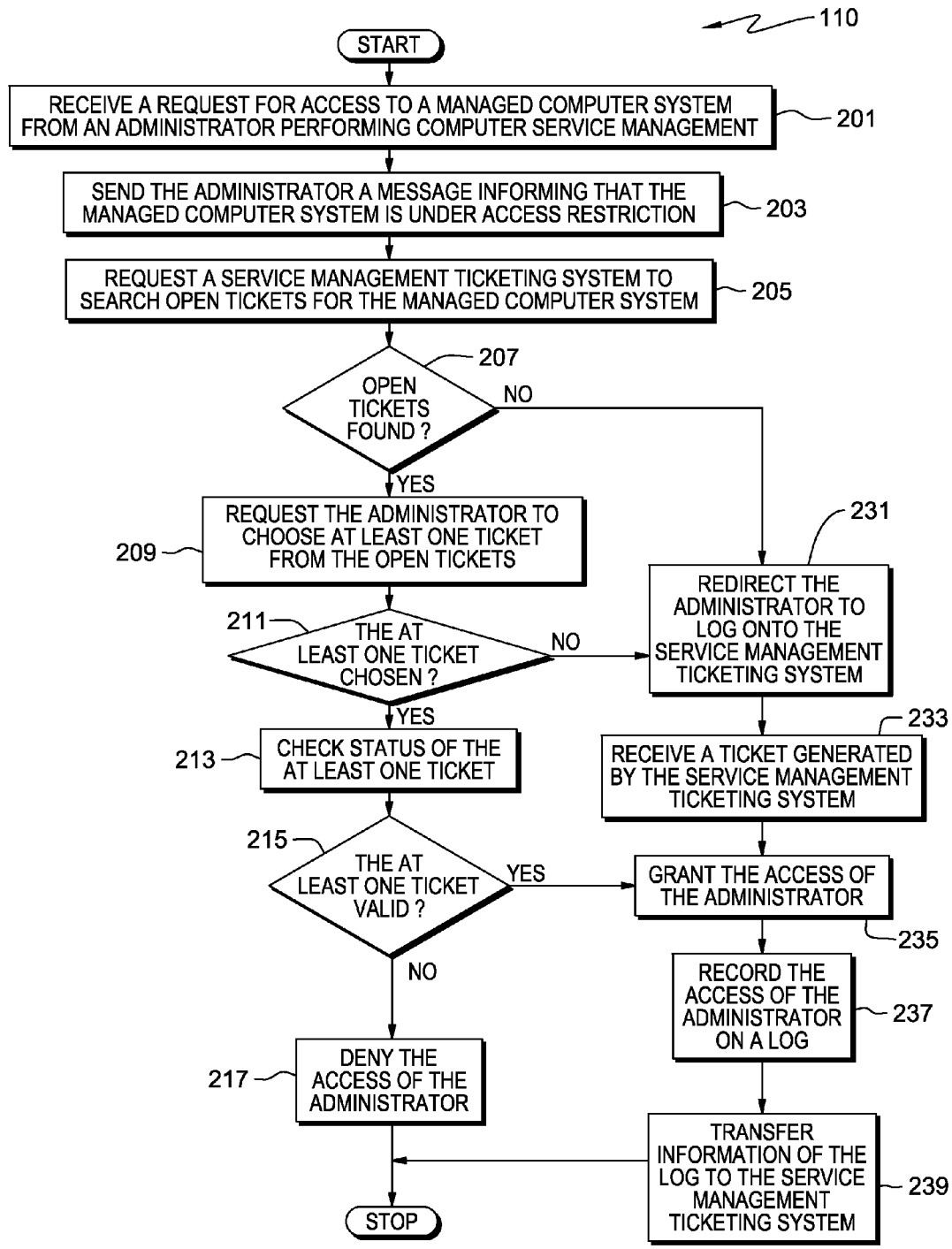
FIG. 2 is a flowchart illustrating operational steps of managing and controlling administrator access to a managed computer system, in accordance with an exemplary embodiment of the present invention.

FIG. 2 is a flowchart illustrating operational steps of managing and controlling administrator access to one of managed computer systems 120 shown in FIG. 1, in accordance with an exemplary embodiment of the present invention. In the exemplary embodiment of the invention, the operational steps are implemented by interceptor 110 shown in FIG. 1. Interceptor 110 is software including at least one computer program on the access system.

Referring to FIG. 2, at step 201, interceptor 110 on the access system receives a request for access to a specific one of managed computer systems 120, e.g. managed computer system 1 120(1) shown in FIG. 1, from an administrator who performs computer service management on the specific one of managed computer systems 120. The request of the administrator is made at the access system which is an entry point to managed computer systems 120. At step 203, interceptor 110 sends the administrator a message, informing that the specific one of managed computer systems 120 is under access restriction. At step 205, interceptor 110 requests service management ticketing system 132 on managing computer system 130 (shown in FIG. 1) to search open service management tickets. Service management ticketing system 132 conducts a search by querying CMDB 134 (shown in FIG. 1) which is also on managing computer system 130.

At decision block 207, interceptor 110 determines, in response to receiving the search result from service management ticketing system 132, whether the open service management tickets are found. At step 209 (YES branch of decision block 207), in response to that the open service management tickets are found, interceptor 110 requests the administrator to choose at least one ticket from the open service management tickets. At step 231 (NO branch of decision block 207), in response to that the open service management tickets are not found, interceptor 110 redirects the administrator to log onto service management ticketing system 132, in order for the administrator to have a new ticket generated by service management ticketing system 132.

After step 209, interceptor 110 determines, at decision block 211, whether the administrator chooses the at least one ticket. In response to that the administrator chooses the at least one ticket, at step 213 (YES branch of decision block 211), interceptor 110 checks status of the at least one ticket. For example, interceptor 110 checks whether a change ticket has the status of "in progress" or "scheduled". In response to that the administrator does not choose the at least one ticket, interceptor 110 redirects, at step 231 (NO branch of decision block 211), the administrator to log onto service management ticketing system 132, in order for the administrator to have a new ticket generated by service management ticketing system 132.

After step 213, interceptor 110 determines, at decision block 215, whether the at least one ticket is valid. For example, interceptor 110 determines that a change ticket at the status of "in progress" is valid or a change ticket at the status of "scheduled" is not valid. In response to determining that the at least one ticket is valid, interceptor 110, at step 235 (YES branch of decision block 215), grants the administrator the access to the specific one of managed computer systems 120. In response to determining that the at least one ticket is not valid, interceptor 110, at step 217 (NO branch of decision block 215), denies the administrator the access to the specific one of managed computer systems 120.

After previously-mentioned step 231 at which interceptor 110 redirects the administrator to log onto service management ticketing system 132, interceptor 110 receives, at step 233, a ticket generated for the administrator by service management ticketing system 132. Then, interceptor 110 grants, at step 235, the administrator the access to the specific one of managed computer systems 120.

After previously-mentioned step 235 at which interceptor 110 grants the administrator the access to the specific one of managed computer systems 120, at step 237, interceptor 110 records the administrator access to the specific one of managed computer systems 120 on a log. For example, interceptor 110 may record who, when and why the administrator logs onto the specific one of managed computer system 120. At step 239, interceptor 110 transfers information of the log to service management ticketing system 132. The transferred information is then stored on CMDB 134.

In other embodiments, after interceptor 110 determines whether the at least one ticket is valid at decision block 215, interceptor 110 allows the administrator read-only access to the specific one of managed computer system 120, in response to determining that no ticket is valid. Thus, the administrator is given the read-only access instead of denial to the specific one of managed computer system 120. In the other embodiments, allowing the read-only access is a substitutive step of step 217 in FIG. 2, as a "no" branch of decision block 215. After allowing the read-only access, interceptor 110, in a further step, logs the read-only access of the administrator.

Figure 3:
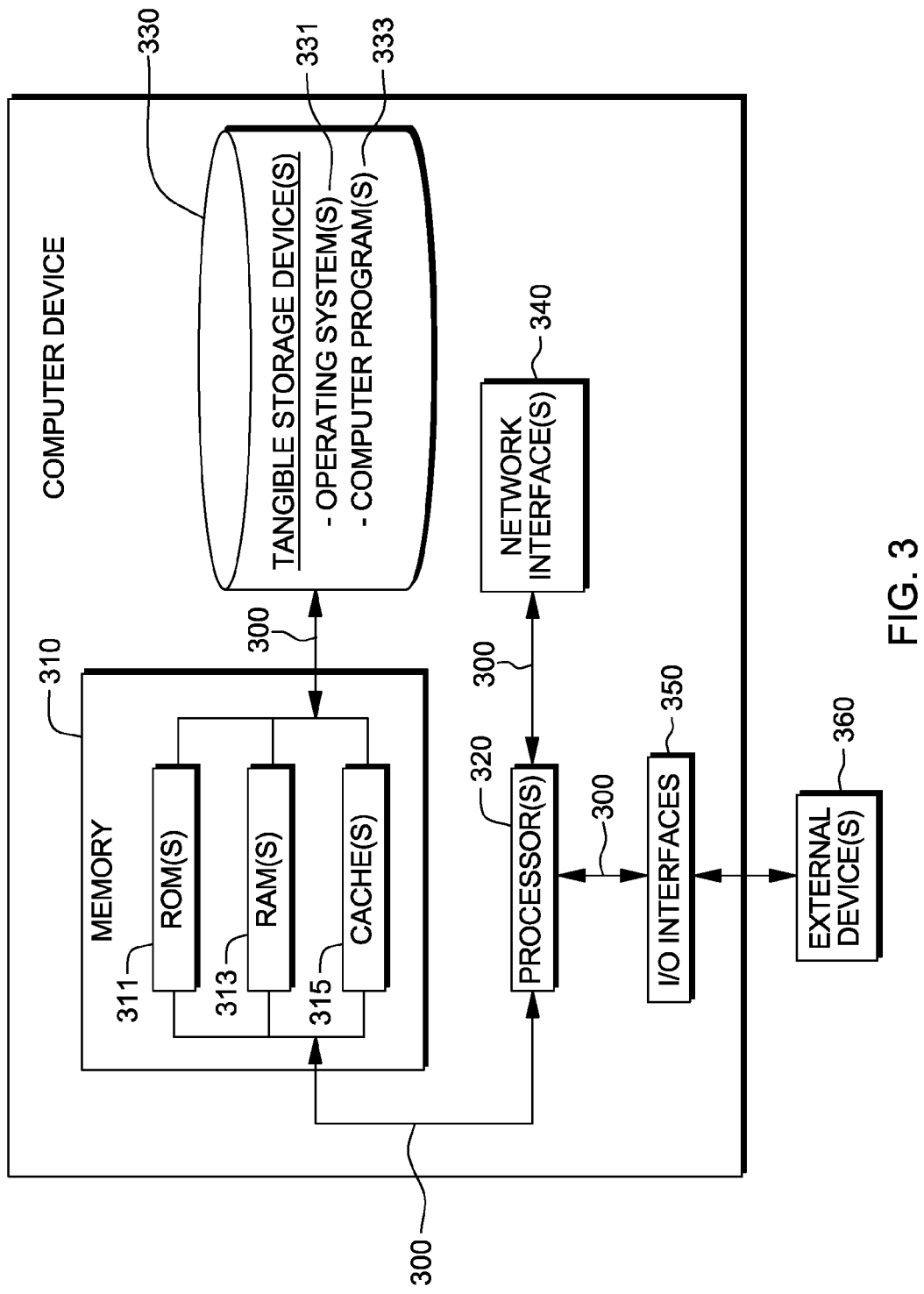
FIG. 3 is a diagram of a computer device hosting a managed computer system, an access system, or a managing computer system, in accordance with an exemplary embodiment of the present invention.

FIG. 3 is a diagram of a computer device hosting one of managed computer systems 120, interceptor 110 on an access system, or managing computer system 130 (shown in FIG. 1), in accordance with an exemplary embodiment of the present invention. It should be appreciated that FIG. 3 provides only an illustration of one implementation and does not imply any limitations with regard to the environment in which different embodiments may be implemented.

Referring to FIG. 3, the computer device includes communications fabric 300 which provides communications among processor(s) 320, memory 310, tangible storage device(s) 330, network interface(s) 340, and I/O (input/output) interface(s) 350. Memory 310 includes ROM(s) (Read Only Memory) 311, RAM(s) (Random Access Memory) 313, and cache(s) 315.

One or more operating system(s) 331 and one or more computer program(s) 333 reside on one or more computer-readable tangible storage device(s) 330. In the exemplary embodiment, on a computer device hosting the access system, one or more computer program(s) 333 include interceptor 110 which is software comprising at least one computer program. In the exemplary embodiment, on a computer device hosting managing computer system 130, service management ticketing system 132 (shown in FIG. 1) resides on one or more computer-readable tangible storage device(s) 330. Configuration management database (CMDB) 134 (shown in FIG. 1) also resides on one or more computer-readable tangible storage device(s) 330. In other embodiments, service management ticketing system 132 and CMDB 134 may reside on two separate computer devices, respectively.

The computer device further includes I/O interface(s) 350. I/O interface(s) 350 allow for input and output of data with external device(s) 360 that may be connected to the computer device. The computer device further includes network interface(s) 340 for communications between the computer device and a computer network.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for managing and controlling access of an administrator to a managed computer system, the method implemented by at least one computer program on an access system of the managed computer system, the method comprising:

receiving, by the access system of the managed computer system, from the administrator, a request for access to the managed computer system;

requesting, by the access system of the managed computer system, a managing computer system to search open tickets which are managed by the managing computer system for the managed computer system;

requesting, by the access system of the managed computer system, the administrator to choose at least one ticket from the open tickets, in response to that the open tickets are found;

checking, by the access system of the managed computer system, in response to determining that the administrator chooses the at least one ticket from the open tickets, status of the at least one ticket;

redirecting, by the access system of the managed computer system, the administrator to the managing computer system for a new service management ticket generated by the managing computer system, in response to determining that the open tickets are not found;

receiving, by the access system of the managed computer system, from the managing computer system, the new service management ticket; and granting, by the access system of the managed computer system, the administrator the access to the managed computer system, based on at least one of: determining that the status of the at least one ticket is valid and determining that the new service management ticket is received.

2. The method of claim 1, further comprising:

denying, by the access system of the managed computer system, the administrator the access to the managed computer system, in response to determining that the status of the at least one ticket is not valid.

3. The method of claim 1, further comprising:

allowing, by the access system of the managed computer system, the administrator read-only access to the managed computer system, in response to determining that the status of the at least one ticket is not valid.

4. The method of claim 1, further comprising:

redirecting, by the access system of the managed computer system, the administrator to the managing computer system for a new service management ticket generated by the managing computer system, in response to that the administrator does not choose the at least one ticket from the open tickets;

receiving, by the access system of the managed computer system, from the managing computer system, the new service management ticket generated by the managing computer system; and granting, by the access system of the managed computer system, the administrator the access to the managed computer system.

5. The method of claim 1, further comprising:

recording, by the access system of the managed computer system, on a log the access of the administrator; and transferring, by the access system of the managed computer system, information of the log to the managing computer system.

6. The method of claim 1, wherein the access system is a firewall to the managed computer system, a proxy server, or a virtual private network server, and wherein the access system is an entry point to one or more managed computer systems.

7. A method for managing and controlling access of an administrator to a managed computer system, the method implemented by at least one computer program on an access system of the managed computer system, the method comprising:

receiving, by the access system of the managed computer system, from the administrator, a request for access to the managed computer system;

requesting, by the access system of the managed computer system, a managing computer system to search open tickets which are managed by the managing computer system for the managed computer system;

requesting, by the access system of the managed computer system, the administrator to choose at least one ticket from the open tickets, in response to determine that the open tickets are found;

redirecting, by the access system of the managed computer system, the administrator to the managing computer system for a new service management ticket generated by the managing computer system, based on at least one of: determining that the open tickets are not found and determining that the administrator does not choose the at least one ticket from the open tickets;

receiving, by the access system of the managed computer system, from the managing computer system, the new service management ticket generated by the managing computer system; and granting, by the access system of the managed computer system, the administrator the access to the managed computer system.

8. The method of claim 7, further comprising:
checking, by the access system of the managed computer system, in response to determining that the administrator chooses the at least one ticket from the open tickets, status of the at least one ticket; and
granting, by the access system of the managed computer system, the administrator the access to the managed computer system, in response to determining that the status of the at least one ticket is valid.

9. The method of claim 8, further comprising:
denying, by the access system of the managed computer system, the administrator the access to the managed computer system, in response to determining that the status of the at least one ticket is not valid.

10. The method of claim 8, further comprising:
allowing, by the access system of the managed computer system, the administrator read-only access to the managed computer system, in response to determining that the status of the at least one ticket is not valid.

11. The method of claim 7, further comprising:
recording, by the access system of the managed computer system, on a log the access of the administrator; and
transferring, by the access system of the managed computer system, information of the log to the managing computer system.

12. The method of claim 7, wherein the access system is a firewall to the managed computer system, a proxy server, or a virtual private network server, and wherein the access system is an entry point to one or more managed computer systems.

13. A computer program product for managing and controlling access of an administrator to a managed computer system, the computer program product comprising:
one or more computer-readable tangible storage devices and program instructions stored on at least one of the one or more tangible storage devices, the program instructions comprising:
program instructions to receive, by the access system of the managed computer system, from the administrator, a request for access to the managed computer system;
program instructions to request, by the access system of the managed computer system, a managing computer system to search open tickets which are managed by the managing computer system for the managed computer system;
program instructions to request, by the access system of the managed computer system, the administrator to choose at least one ticket from the open tickets, in response to that the open tickets are found;
program instructions to check, by the access system of the managed computer system, in response to determining that the administrator chooses the at least one ticket from the open tickets, status of the at least one ticket;
program instructions to redirect, by the access system of the managed computer system, the administrator to the managing computer system for a new service management ticket generated by the managing computer system, in response to determining that the open tickets are not found;
program instructions to receive, by the access system of the managed computer system, from the managing computer system, the new service management ticket; and
program instructions to grant, by the access system of the managed computer system, the administrator the access to the managed computer system, based on at least one of: determining that the status of the at least one ticket is valid and determining that the new service management ticket is received.

14. The computer program product of claim 13, further comprising:
program instructions to deny, by the access system of the managed computer system, the administrator the access to the managed computer system, in response to determining that the status of the at least one ticket is not valid.

15. The computer program product of claim 13, further comprising:
program instructions to allow, by the access system of the managed computer system, the administrator read-only access to the managed computer system, in response to determining that the status of the at least one ticket is not valid.

16. The computer program product of claim 13, further comprising:
program instructions to redirect, by the access system of the managed computer system, the administrator to the managing computer system for a new service management ticket generated by the managing computer system, in response to that the administrator does not choose the at least one ticket from the open tickets;
program instructions to receive, by the access system of the managed computer system, from the managing computer system, the new service management ticket generated by the managing computer system; and
program instructions to grant, by the access system of the managed computer system, the administrator the access to the managed computer system.

17. The computer program product of claim 13, further comprising:
program instructions to record, by the access system of the managed computer system, on a log the access of the administrator; and
program instructions to transfer, by the access system of the managed computer system, information of the log to the managing computer system.

* * * * *